(12) United States Patent
Kanter et al.

(10) Patent No.: US 6,410,067 B1
(45) Date of Patent: Jun. 25, 2002

(54) EQUINE NEUTRACEUTICALS

(76) Inventors: Morton Jay Kanter, 103 S. Dawson Ave., Columbus, OH (US) 43209; Lynn E. Taylor, 4461 S. Old 3C Hwy., Westerville, OH (US) 43082

( * ) Notice: Subject to any disclaimer, the term of this patent is extended or adjusted under 35 U.S.C. 154(b) by 0 days.

(21) Appl. No.: 09/708,861

(22) Filed: Nov. 8, 2000

Related U.S. Application Data

(60) Provisional application No. 60/178,344, filed on Jan. 27, 2000.

(51) Int. Cl.[7] ............................................. A23K 1/18
(52) U.S. Cl. ..................... 426/272; 426/601; 426/630; 426/654; 426/807
(58) Field of Search ................... 426/272, 630, 426/601, 654, 807

(56) References Cited

U.S. PATENT DOCUMENTS

| | | | | |
|---|---|---|---|---|
| 3,993,796 A | * | 11/1976 | Steinke | 426/630 |
| 4,053,492 A | * | 10/1977 | Boocock et al. | 260/412.4 |
| 5,017,614 A | * | 5/1991 | Pariza et al. | 514/558 |
| 5,620,692 A | * | 4/1997 | Potter et al. | 424/401 |
| 6,020,378 A | * | 2/2000 | Cook et al. | 514/560 |

* cited by examiner

*Primary Examiner*—Chhaya D. Sayala
(74) *Attorney, Agent, or Firm*—Mueller and Smith LPA

(57) ABSTRACT

We describe a highly stable oat oil-conjugated linoleic acid isomeric mixture composition as an ingredient in an oral neutraceutical supplement and method of delivery to equine that meets the dietary needs of neonates, immuno-compromised, athletic horses, and geriatrics. The increased activity and/or stress levels exhibited by the above mentioned groups requires 2–4 times the daily digestible energy as well as additional vitamins and minerals. The neutraceutical supplement consists of at least 20% crude fat, which contains at least a 50% oat oil-6% CLA isomeric mixture composition; and which imparts a remarkable stability to the formulation.

6 Claims, No Drawings

EQUINE NEUTRACEUTICALS

CROSS-REFERENCE TO RELATED APPLICATIONS

We claim the benefit of Provisional patent application No. 60/178,344 filed Jan. 27, 2000.

STATEMENT REGARDING FEDERALLY SPONSORED RESEARCH

Not applicable.

BACKGROUND OF THE INVENTION

The supplementation of fat in the equine diet is now fairly common with the most common fat sources including corn oil, soybean oil, coconut oil, and rice bran oil. These oils all have short shelf-lives under field conditions and will tend to become rancid at high temperatures when used either alone or when added to fat supplements containing other nutrients as well as vitamins and minerals.

The present invention describes a method to increase the shelf-life of fat supplements that contain the above mentioned oils by adding oat oil to the crude fat mixture or by using oat oil as the single source of crude fat in the supplement. The invention further describes the use of oat oil alone as a top dressing or the use of oat oil in the combination with an isomeric mixture of conjugated linoleic acids (CLA) as a top dressing.

Previous work in horses and ponies indicate that fat supplementation in the equine diet is a safe way to increase caloric density. Horses requiring increased amounts of digestible energy may experience an overload of carbohydrates, which may set up a cascade of events leading to the appearance of diseases such as colic, laminitis, founder, azoturia, and gastric ulcers. It has been estimated that 90% of all Thoroughbred racehorses develop gastric ulcers during training and racing, making it one of the most common performance related problems in the equine athlete. Colic continues to be the number one cause of death in horses in the United States.

In addition to its protective effects, studies conducted over the last 15–20 years suggest that fat supplementation may have a beneficial effect on performance. A fat supplement may also help meet the needs of newborn and orphaned foals which require the passive transmission of antibodies from the dam's colostrums for immunity. Common diseases such as complications from respiratory disease and diarrhea, two conditions that are often initiated when the foal fails to thrive, can be treated by supplementation of the newborn's diet, or prevented by supplementation of the dam's diet.

Older horses can benefit from fat supplements as it is an easy digestible source of additional calories. Geriatrics suffering from inefficiencies in intestinal absorption often present poor body conditions and are highly susceptible to various disease conditions.

Thus, fat supplementation in equine addresses a variety of horses and conditions. Increasing the shelf-life of these supplement further guarantees that the horses will receive the full benefit of the nutrients with added safety. Equine dietary preparations using the present invention have not been previously reported.

References in this field include; U.S. Pat. No. 3,993,793 (Steinke), U.S. Pat. No. 4,063,492 (Brooke), U.S. Pat. No. 5,017,614 (Pariza and Ha), U.S. Pat. No. 5,986,116 (Iwata), U.S. Pat. No. 6,015,833 (Saegbo), and David S. Kronfeld, et al., "Optimal Nutrition of Athletic Performance, with Emphasis on Fat Adaptation in Dogs and Horses" *J. Nutrition* (1994), 124 (12S), 2745S-53S.

SUMMARY OF THE INVENTION

Fat supplements containing at least 20% crude fat, for example supplements that contain 20% of oil derived from rice bran, exhibit short shelf lifetimes under field conditions. The present invention utilizes a particular oil composition that exhibits a surprisingly remarkable stability to rancidity under extreme conditions, as a top dressing neat or admixed with another oil, for example sunflower oil, or when introduced as part of a total nutritional fat supplement, in proportions up to 50%. Thus, the oil composition of the supplement in this description may contain from 100% to 50% oat oil-an extracted by-product of the Avena sativa plant—in combination with other oils including sunflower oil, corn oil, or soybean oil. The stability of these oils is enhanced by combining them with the oat oil-containing extract. Natural oat oil is the cold extracted, oil fraction of processed oats. The enzyme lipase has been removed to prevent fat degradation.

In some cases, the oil phase will contain oat oil and a conjugated linoleic acid (CLA) isomeric mixture. Commercial preparations of CLA isomeric mixtures are prepared from sunflower seed oil containing linoleic acid. CLA prepared from linoleic-rich rich oils tend to have ratios of 9c, 1 1t-CLA to 10t, 12c-CLA of less than 1:1, typically 0.6–0.97 to 1. The oat oil-CLA isomeric mixture composition is protected from rancidity and also increases the shelf life of other admixed oils in the supplements described below.

It is to be understood that the equine fat supplements of the present invention are not limited to the oil compositions or concentrations described. The supplement may be administered in various forms, such as a top dress liquid, or may be included as an ingredient in a complete nutritional supplement. The quantity of the formulation administered to an equine, as well as the length of time of administration is dependent on various factors, such as body weight and condition, age, general health and state of nutrition activity level, and type of severity of a specified ailment or unknown condition.

DESCRIPTION PREFERRED EMBODIMENTS

A stable high fat containing hard dry feed pellet (>20% total fat content) can be manufactured in accordance with the processes described in U.S. Pat. No. 3,993,796, the fat content of which contains no less than 50% oat oil and no less than 5% of a mixture of isomers of conjugated linoleic acids. The raw materials of the present invention are oleaginous seeds, that is, seeds of soybeans, cottonseeds, sunflower seeds, and the like, either with hulls or dehulled that have not been defatted prior to processing but rather contain their natural oil intact, and a spray dried blend which consists of vegetable oil contain >50% oat oil and up to 6% CLA, and protein isolate.

For purposes of the present invention, a water solution is prepared by forming a slurry of the protein isolate and water which comprises a weight ratio of solids to water of about 8:1 or greater. The spray dried blend mentioned above is prepared by withdrawing water, via conventional spray drying techniques, from an oil-in-water emulsion in which the edible oil is the dispersed phase and a water solution of the protein isolate is the continuous phase. Various emulsifying agents may be used in the slurry including but not limited to lecithin, esters of polyhydric alcohols, and polyoxyethylene sorbitan monolaurate or trioleate.

By this process the dispersed oil phase is completely entrapped in a solid proteinaceous phase and the resultant dry solid particles are utilized as the fat supplement herein referred to as the spray-dried blend. It can be mixed with feed ingredients prior to pelletizing the feed, in an amount such that as high as 50% by weight of the resultant mixture is fat, and yet will not cause undue slippage in the pelletizing dies nor detract from the hardness of the pellets, and due to the addition of the oat oil, add significantly to the shelf-life of the final product, thus producing a safer and more efficient method to add fat in high proportion to the equine diet.

In accordance with the prior art, the hard dry animal feed pellets are made by the following steps:

(1) The oleaginous seeds are reduced to finely divided particles, preferably smaller than 0.065 inch, the seeds can be heated to about 100 degrees C for about 25 minutes prior to being ground, in order to denaturize proteins or destroy enzymes that may inhibit protein digestibility.

(2) The seed particles with their oils still intact are mixed with about 25% by weight of the spray-dried blend.

(3) The mixture is steam heated to 170–200 degree F. Heating to 180 degree F will provide a 17% level of moisture content.

(4) Finally, the mixture is pelletized; the pelleting may be done with any conventional pelleting apparatus. The pellets are then dried by any convention drying method, to a moisture content of from about 0 to 14% water. The pellets will contain preferably between 20–35 wt-% fat and be hard and dry to the appearance.

EXAMPLE

One Hundred fifty pounds of whole, unextracted soybeans were cooked in an autoclave in 10-pound batches at 100 degrees C using sparge steam. Thereafter, the soybeans were dried and ground through a 1511-0065 screen on a Fitz Mill. A spray dried product which contains 43% oat oil and 9% conjugated linoleic acid isomer mixture and 40% Supro 620 protein isolate, plus various amounts of emulsifiers and water, was produced by emulsifying the oils in an aqueous solution of the Supro and then spray dried. The spray dried blend and the reduced soybean particles were used in various amounts to produce total fat contents of between 23 and 27%.

We claim:

1. An equine feed pellet composition, comprising:

(a) between about 20% to 50% by weight total oil content of which between about 50% and 100% thereof is oat oil;

(b) up to about 9% by weight conjugated linoleic acid isomer mixture; and (c) protein isolate.

2. The composition of claim 1, wherein the oil content includes a vegetable oil, which is one or more of soybean oil, sunflower oil, corn oil, coconut oil, rice oil, or safflower oil.

3. The composition of claim 1, wherein the oat oil comprises at least 100% by weight of the total oil content.

4. The composition of claim 1, wherein the conjugated linoleic acid isomer mixture comprises at least 5% by weight.

5. The composition of claim 4, wherein the oat oil is the total oil content thereof.

6. An equine top dress liquid mixture of comprising by weight: 85%–100% oat oil and 0%–15% conjugated linoleic acid isomer mixture.

* * * * *